US009066406B1

(12) United States Patent  (10) Patent No.: US 9,066,406 B1
Xiong  (45) Date of Patent: Jun. 23, 2015

(54) LED DRIVER AND PROTECTION CIRCUIT FOR OUTPUT SHORT CONDITIONS

(71) Applicant: Universal Lighting Technologies, Inc., Madison, AL (US)

(72) Inventor: Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 235 days.

(21) Appl. No.: 13/886,428

(22) Filed: May 3, 2013

Related U.S. Application Data

(60) Provisional application No. 61/642,839, filed on May 4, 2012.

(51) Int. Cl.
| | | |
|---|---|---|
| H05B 37/00 | (2006.01) |
| H05B 41/00 | (2006.01) |
| H05B 33/08 | (2006.01) |
| H02M 3/156 | (2006.01) |

(52) U.S. Cl.
CPC ........... *H05B 33/0878* (2013.01); *H02M 3/156* (2013.01)

(58) Field of Classification Search
CPC .... H02H 7/127; H05B 41/46; H05B 41/2855; H05B 41/2851; H05B 37/036; H05B 37/03; H05B 39/105
USPC ............. 315/119–123, 125–130, 185 R, 186, 315/193, 209 R, 276, 246, 291, 297, 307, 315/308, 310; 327/108–112, 378–381, 327/387–390, 394, 551; 326/82, 83
See application file for complete search history.

(56) References Cited

U.S. PATENT DOCUMENTS

| | | | |
|---|---|---|---|
| 5,903,181 A * | 5/1999 | Mori .............................. 327/389 |
| 6,054,816 A * | 4/2000 | Jurek et al. .................... 315/291 |
| 7,224,150 B2 * | 5/2007 | Iwabuki et al. ............... 323/225 |
| 8,288,958 B2 * | 10/2012 | Rinaldi ......................... 315/291 |
| 8,928,231 B2 * | 1/2015 | Campos et al. ............... 315/122 |
| 2010/0268494 A1* | 10/2010 | Heizer et al. .................... 702/63 |
| 2013/0187550 A1* | 7/2013 | Lo et al. ......................... 315/122 |
| 2014/0143560 A1* | 5/2014 | Kwon et al. ................... 713/300 |
| 2014/0152180 A1* | 6/2014 | Wolf et al. .................... 315/122 |

* cited by examiner

*Primary Examiner* — Lincoln Donovan
*Assistant Examiner* — Thomas Skibinski
(74) *Attorney, Agent, or Firm* — Patterson Intellectual Property Law, P.C.; Mark J. Patterson; Gary L. Montle

(57) ABSTRACT

An LED driver circuit is provided with protection against short circuits between output terminals. Two switches are coupled in series with the LED load. A first capacitor is coupled to gate terminals for the first and second switches and defines a first gate charge time. A first failure detection circuit includes a third switch coupled across the first capacitor, a second capacitor defining a second gate charge time for the third switch, the second gate charge time being less than the first, and a zener diode having a threshold voltage less than a maximum output voltage during normal operation. The failure detection circuit disables the third switch during normal operation, and during short conditions enables the third switch to short the gates of the first and second switches. A second failure detection circuit is identical to the first, and coupled in parallel to protect against circuit failure.

20 Claims, 2 Drawing Sheets

LED DRIVER AND PROTECTION CIRCUIT FOR OUTPUT SHORT CONDITIONS

CROSS-REFERENCES TO RELATED APPLICATIONS

This application claims benefit of the following patent application(s) which is/are hereby incorporated by reference: U.S. Provisional Patent Application No. 61/642,839, filed May 4, 2012.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to light source driver circuits. More particularly, the invention relates to driver circuits for LED lighting having auxiliary circuitry to protect against output short conditions.

Light emitting diode (LED) lighting is growing in popularity due to decreasing costs and long life compared to incandescent lighting and fluorescent lighting. LED lighting can also be dimmed without impairing the useful life of the LED light source.

Isolated constant current source topologies that are commonly used in light source (e.g., LED) driver circuits include flyback converters, forward converters, LLC converters, and half-bridge isolated buck converters. Flyback converters and forward converters have low efficiency and require the use of high-voltage MOSFET devices. LLC converters have insufficient output voltage range, and the output is not self-limiting. Half-bridge isolated buck converters require hard switching of the MOSFET devices, have low efficiency, require complicated controllers, and the output is not self-limiting.

There is a particular CLASS-2 LED driver as defined in Underwriters Laboratories specifications. The specification requires the LED driver to be isolated and have a maximum output voltage of 60 volts DC at any given time. If a maximum voltage of a load (e.g., a light source such as an LED string) is close to 60 volts, then limiting the output voltage to 60 volts by operation of the control loop in the driver circuit is difficult because control loops inherently have over-shoot and delay.

An LED driver circuit should be capable of driving different loads that have different numbers of LEDs. Thus, the LED driver has to be capable of a wide range of output voltages while maintaining control of the output current.

Also, the maximum output current from an LED driver circuit must always be less than 8 A, even where a component has failed within the driver circuit. One particularly bad condition is where a component has failed and caused the output wires to be shorted. A reliable driver circuit should be designed to control the output current tightly enough to meet the UL CLASS-2 standard even in this case.

BRIEF SUMMARY OF THE INVENTION

In accordance with one embodiment of the present invention, an LED driver circuit is provided with protection against short circuits between output terminals. The LED driver circuit is generally configured to provide current to a DC load, such as an array of light-emitting diodes (LED's) from a direct current (DC) power source. First and second switches are coupled in series with the LED load. A first capacitor is coupled to gate terminals for the first and second switches and defines a first gate charge time. A first failure detection circuit includes a third switch coupled across the first capacitor, a second capacitor defining a second gate charge time for the third switch, the second gate charge time being less than the first, and a zener diode having a threshold voltage less than a maximum output voltage during normal operation. The failure detection circuit disables the third switch during normal operation, and during short conditions enables the third switch to short the gates of the first and second switches. A second failure detection circuit is identical to the first, and is coupled in parallel to protect against circuit failure.

In another exemplary embodiment of the present invention, the LED driver circuit may further include an input rectifier for rectifying AC input power from an external AC power source, the input rectifier defining the DC power source.

In another exemplary embodiment of the present invention, a light fixture may include a housing within which resides the input rectifier, the driver circuit and an array of LED's configured to receive current from the driver circuit.

In one aspect of the present invention according to these embodiments, the threshold device may be a zener diode having an anode coupled to the node between the second energy storage device and the gate terminal for the third switching element and a cathode coupled to a node between the second switching element and one of the output terminals.

In another aspect of these embodiments, first and second resistors defining a voltage divider may be coupled across the first and second switching elements, the first and second resistors further configured wherein a divided output voltage from the driver circuit during the normal operating mode is less than the voltage threshold of the failure detection circuit.

In another aspect of these embodiments, a DC-DC converter may be coupled between the DC power source and the first and second switching elements, the DC-DC converter being operable to regulate DC energy from the DC power source to the load.

In another aspect of these embodiments, the failure mode may be defined as a short circuit condition between the first and second output terminals, wherein when the short circuit condition is removed the output voltage drops below the threshold voltage, the third switching element is turned off and the first and second switching elements are turned on.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

Figure 1:
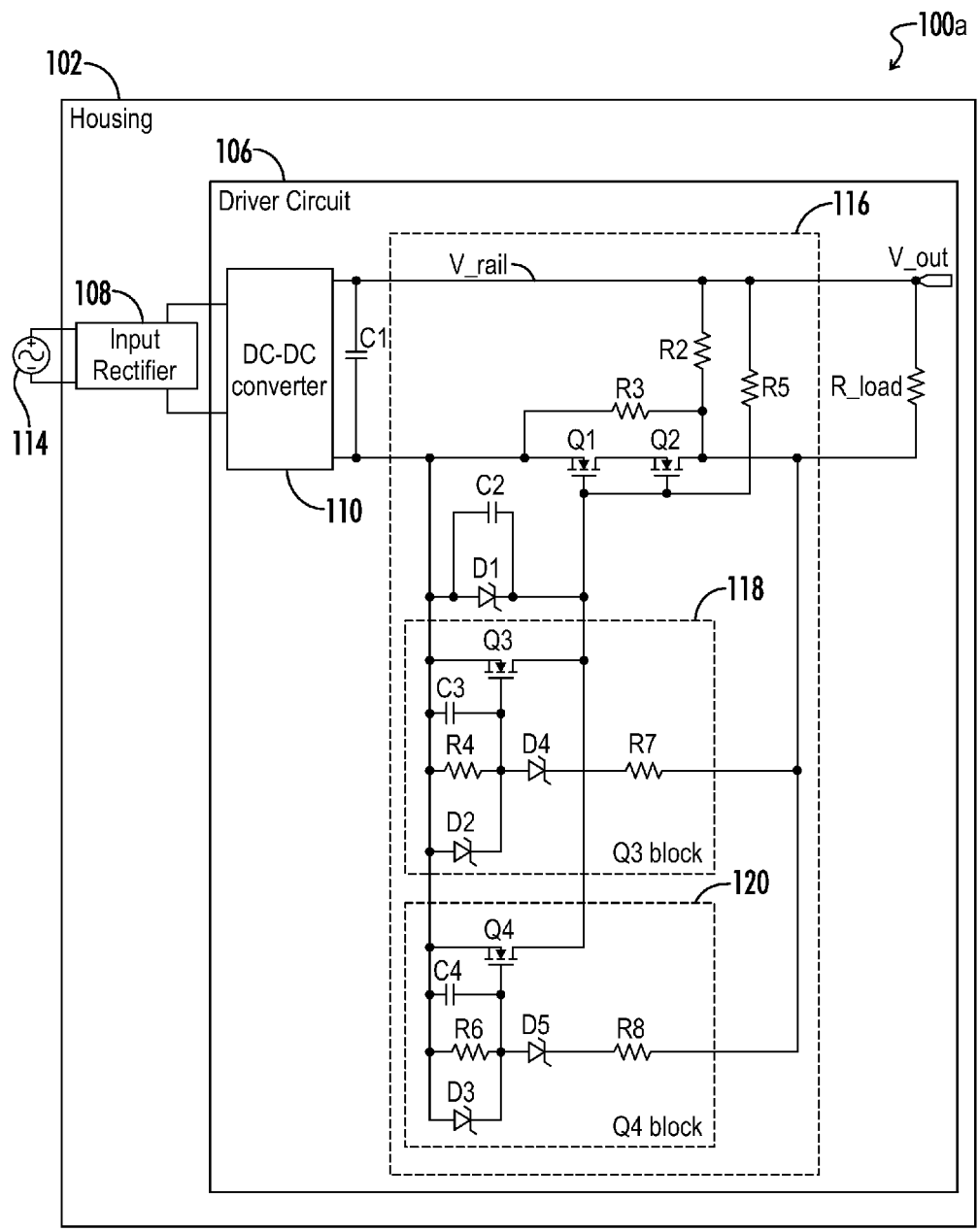
FIG. 1 is a block diagram and partial schematic diagram representing a light fixture according to an embodiment of the present invention, including an LED driver circuit with output short protection components.

Referring to FIG. 1, in a particular embodiment according to the present invention, a light fixture 100a receives power from an alternating current (AC) power source 114 and provides power to a DC load R_load. The DC load may typically be a light source and such a reference will be maintained hereafter, but the DC load may within the scope of the present invention include other equivalent types. Each light source provides light in response to receiving current. A housing 102 is connected to a driver circuit 106 and the light source. In one embodiment, the housing 102 supports the driver circuit 106 and the light source in a predetermined spatial relationship. In one embodiment, the light source is a plurality of series and/or parallel connected light-emitting diodes (LED's). In one embodiment, the light fixture 100 also includes a dimming circuit operable to provide a dimming signal to a controller 120 of the ballast 106. The dimming signal may typically be indicative of a target current or light intensity level for the light source.

The driver circuit 106 provides current to the light source from the AC power source 114. The driver circuit 106 includes an input rectifier 108 connected to the AC power source 114 and providing a DC power source having a power rail V_RAIL and a ground GND_PWR at an output of the input rectifier 108. In one embodiment, the driver circuit 106 also includes a DC-to-DC converter 110 connected between the input rectifier 108 and an output stage including for example a filtering capacitor C1 and the DC load. The DC-to-DC converter 110 alters a voltage of a power rail V_RAIL of a DC power source provided by the input rectifier 108. The DC-to-DC converter may be, for example, a constant voltage-type converter or a constant current-type converter within the scope of the present invention. The driver circuit 106 provides current to the light sources from the DC power source provided by the input rectifier 108.

Figure 2:
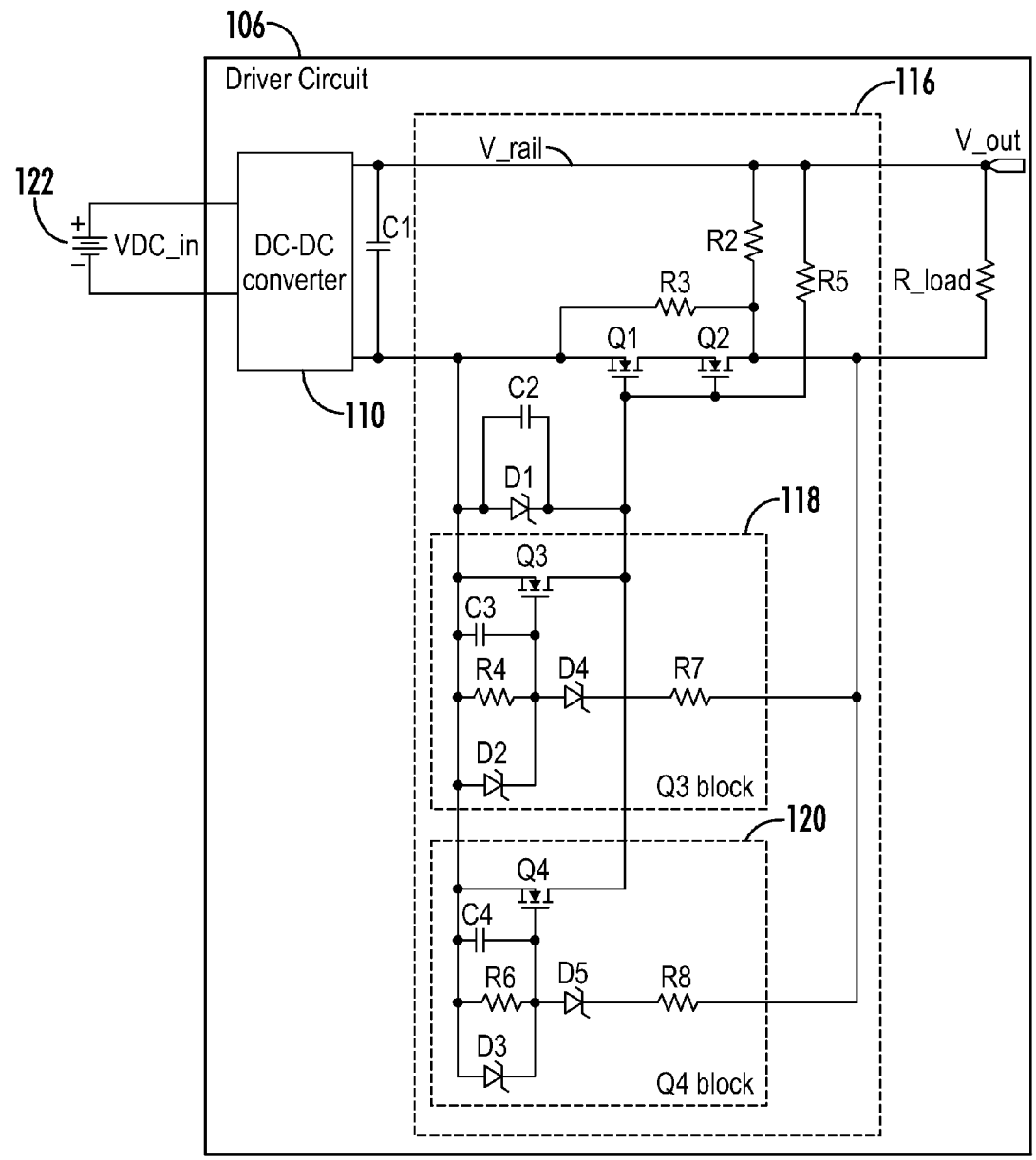
FIG. 2 is a block diagram and partial schematic diagram representing another embodiment of an LED driver and protection circuitry according to the present invention.

Referring to FIG. 2, in an alternative embodiment the driver circuit 106 may be coupled directly to an internal or external DC source 122. The DC source 122 may, without limitation, include a battery, an output from a photovoltaic panel or array, or an input rectifier coupled to an external AC source or the output from, for example, an inverter circuit residing within the same light fixture as the driver circuit.

Various additional components and configurations for a driver circuit 106 may be considered within the scope of the present invention. For example, the DC-DC converter block 110 may include an inverter circuit and an output rectifier, rather than a power factor correction circuit as described above. A power stage and an output stage of the driver circuit 106 may be isolated using, for example, an isolation transformer. In certain embodiments a single power stage (e.g., input rectifier, inverter, resonant circuitry) may be used in combination with a plurality of output stages (e.g., output rectifier, load terminals) within the scope of the present invention.

Referring generally now to FIGS. 1 and 2, a protection circuit 116 according to embodiments of the present invention is coupled between the DC power source 108, 122 (and DC-DC converter 110 where applicable) and the DC load. A first switching element Q1 and a second switching element Q2 are coupled in series with the DC load. The series-connected arrangement of switches Q1, Q2 effectively prevents excessively large output current from being provided even in the event that one of the switching elements Q1, Q2 fails, as long as one of the switching elements Q1, Q2 is disabled to open the circuit. Resistor R2 is coupled on a first end to the power rail and on a second end to a node between the second switching element Q2 and the DC load. Resistor R3 is coupled on a first end to a node between the first switching element Q1 and the DC-DC converter 110, and on a second end to the node between the second switching element Q2 and the DC load. The two resistors R2, R3 thereby define a voltage divider that is preferably configured according to a ratio as further described below.

Another resistor R5 is coupled on a first end to the power rail and on a second end to control terminals (i.e., gate terminals) for the switching elements Q1, Q2. A diode D1 has an anode coupled to a node between the DC-DC converter and a cathode coupled to the control terminals for the switching elements Q1, Q2, the diode D1 operable to protect the control terminals. A capacitor C2 is coupled in parallel with the diode D1 to filter out high-frequency noise.

A first failure detection circuit 118 includes a third switching element Q3 having source and drain terminals coupled across the diode D1. A parallel circuit of a capacitor C3, a resistor R4 and a diode D2 is coupled across the source terminal and the control terminal of the third switching element Q3. A threshold circuit is defined in one embodiment by a zener diode D4 having an anode coupled to the gate terminal of the third switching element Q3 and a cathode coupled to a first end of a resistor R7. The second end of the resistor R7 is coupled to one of the power rails of the driver circuit. A configuration of the voltage divider R2, R3 is determined with respect to a threshold voltage Vth of the zener diode D4 wherein:

$$V_{out}*(R3/R2+R3)<V_{th} \tag{Eq. 1}$$

The threshold voltage Vth for the zener diode D4 in this manner further defines a clamping voltage for the failure detection circuit generally.

In various embodiments, a second failure detection circuit 120 is coupled in parallel with the first failure detection circuit 118. As represented in FIGS. 1 and 2, the second failure detection circuit 120 includes a fourth switching element Q4 having source and drain terminals coupled across the diode D1. A parallel circuit of a capacitor C4, a resistor R6 and a diode D3 is coupled across the source terminal and the control terminal of the fourth switching element Q4. A threshold circuit is defined in one embodiment by another zener diode D5 having an anode coupled to the gate terminal of the fourth switching element Q4 and a cathode coupled to a first end of a resistor R8. The second end of the resistor R8 is coupled to one of the power rails of the driver circuit.

During the following description of an exemplary operation of the above-referenced protection circuitry 116, reference may only be made to components within the first failure detection circuit 118. However, it may be understood that operation of the first and second failure detection circuits 118, 120 as represented in FIGS. 1 and 2 may ordinarily be substantially identical and generally redundant in performing the stated operations and providing the stated functions as recited below.

During a normal operating mode (i.e., wherein a DC load is coupled between the output terminals), the divided output voltage is less than the threshold voltage Vth of the zener diode D4 and the diode D4 therefore does not conduct to turn on the third switching element Q3. The first and second switching elements Q1, Q2 in this condition are turned on normally by a gate drive signal presented via the resistor R5.

During a failure condition, such as for example a short circuit between the output terminals, all of the output voltage will drop across resistor R3 before the first and second switching elements Q1, Q2 are turned on. The capacitance of capacitor C3 in the first failure detection circuit 118 is designed to be smaller than the capacitance of capacitor C2 so that a gate charge time for the first and second switching elements Q1, Q2 is longer (i.e., slower) than a gate charge time for the third switching element Q3. If the output terminals are shorted, the output voltage Vout will turn on the third switching element Q3 first, such that the gate terminals of the first and second switching elements Q1, Q2 are shorted. Therefore, the first and second switching elements Q1, Q2 cannot conduct current during this abnormal condition.

When the failure, or output short, condition is removed, the capacitor C3 will be discharged through resistor R4 in the first failure detection circuit 118. The third switching element Q3 is turned off as the gate-source voltage drops below a threshold value for the third switching element Q3, wherein the gate terminals for the first and second switching elements Q1, Q2 are no longer shorted. The first and second switching elements Q1, Q2 may subsequently be turned on normally by a gate drive signal via resistor R5 and the driver circuit 106 returns to normal operation.

In an embodiment, the configuration and component values for each of the first and second failure detection circuits 118, 120 are substantially identical. As used herein, the term "substantially" identical may encompass certain minute distinctions may exist between certain component values in view of manufacturing, age, component ratings, etc., without being of relevance to a configuration and operation of the respective circuitry according to the present invention. One desirable feature of such redundancy is that if either of the third and fourth switching elements Q3, Q4 were to fail in a given situation, there would still be another switching element remaining to prevent the first and second switching elements Q1, Q2 from turning on when the output is shorted.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure.

While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

What is claimed is:

1. A driver circuit operable to provide current to a load from a direct current (DC) power source, the driver circuit comprising:
   first and second output terminals coupled to a power rail and a circuit ground, respectively;
   first and second switching elements coupled in series between the DC power source and one of the output terminals, each of the first and second switching elements having a respective gate terminal;
   a first energy storage device coupled to the gate terminals for the first and second switching elements and configured to define a first gate charge time for the first and second switching element;
   a failure detection circuit comprising
      a third switching element having a gate terminal, the third switching element coupled on a first end to a node between the DC power source and the first switching element,
      a second energy storage device coupled to the gate terminal for the third switching element and configured to define a second gate charge time for the third switching element, the second gate charge time being less than the first gate charge time, and
      a threshold device having a threshold voltage less than a maximum output voltage across the output terminals during a normal operating mode of the driver circuit, the threshold device coupled to a node between the second energy storage device and the gate terminal for the third switching element;
   wherein the failure detection circuit is configured to block voltage from the gate terminal of the third switching element during the normal operating mode, and
   wherein the failure detection circuit is configured to charge the gate terminal of the third switching element during a failure mode, further wherein the gate terminals of the first and second switching elements are shorted.

2. The driver circuit of claim 1, the threshold device comprising a zener diode having an anode coupled to the node between the second energy storage device and the gate terminal for the third switching element and a cathode coupled to a node between the second switching element and one of the output terminals.

3. The driver circuit of claim 1, wherein the failure detection circuit defines a first failure detection circuit, the driver circuit further comprising a second failure detection circuit, the second failure detection circuit comprising:
- a fourth switching element having a gate terminal, the fourth switching element coupled on a first end to the node between the DC power source and the first switching element;
- a third energy storage device coupled to the gate terminal for the fourth switching element and configured to define a third gate charge time for the fourth switching element, the third gate charge time being less than the first gate charge time, and
- a second threshold device having a threshold voltage less than the maximum output voltage across the output terminals during a normal operating mode of the driver circuit, the second threshold device coupled to a node between the third energy storage device and the gate terminal for the fourth switching element;
- wherein the failure detection circuit is configured to block voltage from the gate terminal of the fourth switching element during the normal operating mode, and
- wherein the failure detection circuit is configured to charge the gate terminal of the fourth switching element during a failure mode, further wherein the gate terminals of the first and second switching elements are shorted.

4. The driver circuit of claim 3, the second threshold device comprising a zener diode having an anode coupled to the node between the third energy storage device and the gate terminal for the fourth switching element and a cathode coupled to a node between the second switching element and one of the output terminals.

5. The driver circuit of claim 4, wherein the first and second failure detection circuits are substantially identical in configuration and coupled in parallel.

6. The driver circuit of claim 1, further comprising first and second resistors defining a voltage divider coupled across the first and second switching elements, the first and second resistors further configured wherein a divided output voltage from the driver circuit during the normal operating mode is less than the voltage threshold of the failure detection circuit.

7. The driver circuit of claim 1, further comprising a DC-DC converter coupled between the DC power source and the first and second switching elements, the DC-DC converter operable to regulate DC energy from the DC power source to the load.

8. The driver circuit of claim 1, wherein the failure mode comprises a short circuit condition between the first and second output terminals, and
wherein when the short circuit condition is removed the output voltage drops below the threshold voltage, the third switching element is turned off and the first and second switching elements are turned on.

9. A driver circuit operable to provide current to a load from an alternating current (AC) power source, the driver circuit comprising:
- an input rectifier configured to connect to the AC power source and to provide a direct current (DC) power source having a power rail and a ground at first and second outputs of the input rectifier;
- a DC-DC converter coupled on a first end to the first and second outputs of the input rectifier, the DC-DC converter operable to regulate DC energy from the DC power source to the load;
- first and second output terminals coupled to a second end of the DC-DC converter via a power rail and a circuit ground, respectively;
- first and second switching elements coupled in series between the DC-DC converter and one of the output terminals, each of the first and second switching elements including a respective gate terminal;
- a first energy storage device coupled to the gate terminals for the first and second switching elements and configured to define a first gate charge time for the first and second switching element;
- a failure detection circuit comprising
  - a third switching element coupled on a first end to a node between the DC-DC converter and the first switching element, the third switching element including a gate terminal,
  - a second energy storage device coupled to the gate terminal for the third switching element and configured to define a second gate charge time for the third switching element, the second gate charge time being less than the first gate charge time, and
  - a threshold device having a threshold voltage less than a maximum output voltage across the output terminals during a normal operating mode of the driver circuit, the threshold device coupled to a node between the second energy storage device and the gate terminal for the third switching element;
- wherein the failure detection circuit is configured to block voltage from the gate terminal of the third switching element during the normal operating mode, and
- wherein the failure detection circuit is configured to charge the gate terminal of the third switching element during a failure mode, further wherein the gate terminals of the first and second switching elements are shorted.

10. The driver circuit of claim 9, the threshold device comprising a zener diode having an anode coupled to the node between the second energy storage device and the gate terminal for the third switching element and a cathode coupled to a node between the second switching element and one of the output terminals.

11. The driver circuit of claim 9, wherein the failure detection circuit defines a first failure detection circuit, the driver circuit further comprising a second failure detection circuit, the second failure detection circuit comprising:
- a fourth switching element coupled on a first end to the node between the DC-DC converter and the first switching element; the fourth switching element including a gate terminal,
- a third energy storage device coupled to the gate terminal for the fourth switching element and configured to define a third gate charge time for the fourth switching element, the third gate charge time being less than the first gate charge time, and
- a second threshold device having a threshold voltage less than the maximum output voltage across the output terminals during a normal operating mode of the driver circuit, the second threshold device coupled to a node between the third energy storage device and the gate terminal for the fourth switching element;
- wherein the failure detection circuit is configured to block voltage from the gate terminal of the fourth switching element during the normal operating mode, and
- wherein the failure detection circuit is configured to charge the gate terminal of the fourth switching element during a failure mode, further wherein the gate terminals of the first and second switching elements are shorted.

12. The driver circuit of claim 11, the second threshold device comprising a zener diode having an anode coupled to the node between the third energy storage device and the gate terminal for the fourth switching element and a cathode coupled to a node between the second switching element and one of the output terminals.

13. The driver circuit of claim 12, wherein the first and second failure detection circuits are substantially identical in configuration and coupled in parallel.

14. The driver circuit of claim 9, further comprising first and second resistors defining a voltage divider coupled across the first and second switching elements, the first and second resistors further configured wherein a divided output voltage from the driver circuit during the normal operating mode is less than the voltage threshold of the failure detection circuit.

15. The driver circuit of claim 9, wherein the failure mode comprises a short circuit condition between the first and second output terminals,
wherein when the short circuit condition is removed the output voltage drops below the threshold voltage, the third switching element is turned off and the first and second switching elements are turned on.

16. A light fixture comprising:
one or more light-emitting diodes operable to provide light in response to receiving current;
an input rectifier configured to connect to an external AC power source and provide a direct current (DC) power source having a power rail and a ground at first and second outputs of the input rectifier;
a housing connected to the light-emitting diodes, the input rectifier and a driver circuit, the driver circuit further comprising
a DC-DC converter coupled on a first end to the outputs of the input rectifier, the DC-DC converter operable to regulate DC energy from the DC power source to the light-emitting diodes;
first and second output terminals coupled to a second end of the DC-DC converter via a power rail and a circuit ground, respectively, and configured to receive opposing ends of the one or more light-emitting diodes;
first and second switching elements coupled in series between the DC-DC converter and one of the output terminals;
a first energy storage device coupled to gate terminals for the first and second switching elements and configured to define a first gate charge time for the first and second switching element;
a failure detection circuit comprising
a third switching element coupled on a first end to a node between the DC-DC converter and the first switching element,
a second energy storage device coupled to a gate terminal for the third switching element and configured to define a second gate charge time for the third switching element, the second gate charge time being less than the first gate charge time, and
a threshold device having a threshold voltage less than a maximum output voltage across the output terminals during a normal operating mode of the driver circuit, the threshold device coupled to a node between the second energy storage device and the gate terminal for the third switching element;
wherein the failure detection circuit is configured to block voltage from the gate terminal of the third switching element during the normal operating mode, and
wherein the failure detection circuit is configured to charge the gate terminal of the third switching element during a failure mode, further wherein the gate terminals of the first and second switching elements are shorted.

17. The light fixture of claim 16, wherein the failure detection circuit is a first failure detection circuit, the driver circuit further comprising a second failure detection circuit, the second failure detection circuit comprising:
a fourth switching element coupled on a first end to the node between the DC-DC converter and the first switching element;
a third energy storage device coupled to a gate terminal for the fourth switching element and configured to define a third gate charge time for the fourth switching element, the third gate charge time being less than the first gate charge time, and
a second threshold device having a threshold voltage less than the maximum output voltage across the output terminals during a normal operating mode of the driver circuit, the second threshold device coupled to a node between the third energy storage device and the gate terminal for the fourth switching element;
wherein the failure detection circuit is configured to block voltage from the gate terminal of the fourth switching element during the normal operating mode, and
wherein the failure detection circuit is configured to charge the gate terminal of the fourth switching element during a failure mode, further wherein the gate terminals of the first and second switching elements are shorted.

18. The light fixture of claim 17, the first threshold device comprising a first zener diode having an anode coupled to the node between the second energy storage device and the gate terminal for the third switching element and a cathode coupled to a node between the second switching element and one of the output terminals,
the second threshold device comprising a second zener diode having an anode coupled to the node between the third energy storage device and the gate terminal for the fourth switching element and a cathode coupled to the node between the second switching element and one of the output terminals.

19. The light fixture of claim 16, further comprising first and second resistors defining a voltage divider coupled across the first and second switching elements, the first and second resistors further configured wherein a divided output voltage from the driver circuit during the normal operating mode is less than the voltage threshold of the failure detection circuit.

20. The light fixture of claim 16, wherein the failure mode comprises a short circuit condition between the first and second output terminals,
wherein when the short circuit condition is removed the output voltage drops below the threshold voltage, the third switching element is turned off and the first and second switching elements are turned on.

* * * * *